United States Patent
Hayashi (10) Patent No.: US 7,894,320 B2
(45) Date of Patent: Feb. 22, 2011

(54) OPTICAL PICKUP DEVICE AND OPTICAL DISC APPARATUS

(75) Inventor: Toshiyuki Hayashi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 363 days.

(21) Appl. No.: 12/081,196

(22) Filed: Apr. 11, 2008

(65) Prior Publication Data

US 2008/0267044 A1 Oct. 30, 2008

(30) Foreign Application Priority Data

Apr. 27, 2007 (JP) .............................. 2007-118364

(51) Int. Cl.
*G11B 7/12* (2006.01)
(52) U.S. Cl. ..................... 369/112.02; 369/112.23; 369/118
(58) Field of Classification Search ........................ None
See application file for complete search history.

(56) References Cited

U.S. PATENT DOCUMENTS

| | | | |
|---|---|---|---|
| 5,901,131 A | 5/1999 | Ootaki et al. | |
| 2002/0093744 A1 | 7/2002 | Yamamoto et al. | |
| 2007/0201341 A1* | 8/2007 | Vrehen et al. | 369/112.05 |

FOREIGN PATENT DOCUMENTS

| | | |
|---|---|---|
| JP | 9-106566 A | 4/1997 |
| JP | 2001-33734 A | 2/2001 |
| JP | 2004-213784 | 7/2004 |
| JP | 2004-296082 | 10/2004 |
| JP | 2006-260694 A | 9/2006 |
| JP | 2006-330089 A | 12/2006 |
| JP | 2006-344274 | 12/2006 |
| WO | WO 2004/059628 A1 | 7/2004 |
| WO | WO 2005/076263 A1 | 8/2005 |
| WO | WO 2005/096289 A1 | 10/2005 |

* cited by examiner

*Primary Examiner*—Wayne R Young
*Assistant Examiner*—Brian Butcher
(74) *Attorney, Agent, or Firm*—Morgan, Lewis & Bockius LLP (57) ABSTRACT

An optical pickup device has: a light source; an objective lens that condenses laser light emitted from the light source on a recording layer of an optical disc; and a movable lens that is disposed between the light source and the objective lens and that is movable along the optical axis. The movable lens is moved to correct for spherical aberration. Between the light source and the objective lens, a RIM intensity adjusting element is also disposed that adjusts the RIM intensity by changing the range within which, as the movable lens is moved, the intensity of the laser light incident on the objective lens can be varied.

11 Claims, 5 Drawing Sheets

DIRECTION OF OPTICAL AXIS

OPTICAL PICKUP DEVICE AND OPTICAL DISC APPARATUS

This application is based on Japanese Patent Application No. 2007-118364 filed on Apr. 27, 2007, the contents of which are hereby incorporated by reference.

BACKGROUND OF THE INVENTION

1. Field of the Invention

The present invention relates to an optical pickup device that irradiates an optical disc with an optical beam to achieve the reading and writing of information, and more particularly to the configuration of an optical pickup device that is ready for a multilayer optical disc. The invention also relates to an optical disc apparatus provided with such an optical pickup device.

2. Description of Related Art

Today, compact discs (hereinafter CDs) and digital versatile discs (hereinafter DVDs) are popular. In addition, in recent years, with the aim to increase the information capacity of optical discs, much research has been done on high-density recording on optical discs. For example, as high-definition DVDs, optical discs that permit the recording of vast amounts of information, namely HD-DVDs and Blu-ray discs (hereinafter BDs), have been put into practical use. Also, with the aim to achieve high-density recording on optical discs, multilayer optical discs, having a plurality of recording layers formed in the direction of their thickness, have been vigorously developed.

In such optical discs, a transparent cover layer is formed on a recording layer to protect it. Naturally, multilayer optical discs have such transparent cover layers and, here, the thickness of these transparent cover layers varies with the position of the recording layers they protect (here, a transparent layer formed between recording layers are also counted as a transparent cover layer). Thus, during playback from different recording layers of a multilayer optical disc, spherical aberration may arise and matter.

In particular, in cases where information is, for example, read from an optical disc with a high information recording density, such as a BD, by use of an optical pickup device, since the optical system of the optical pickup device includes an objective lens with a large numerical aperture (NA), the effect of spherical aberration ascribable to a difference in the thickness of transparent cover layers is magnified. For this reason, in particular, in an optical pickup device ready for a multilayer optical disc with a high information recording density, such as a BD, it is essential to provide a mechanism for correcting spherical aberration.

As to methods for correcting the spherical aberration occurring in the optical system of an optical pickup device, many reports have conventionally been made (see, for example, JP-A-2004-213784 and JP-A-2006-344274). Specifically, for example, a liquid crystal element having concentrically patterned electrodes is used, and the voltages applied to these electrodes are adjusted so as to correct spherical aberration; for another example, an expander lens composed of two lens elements is used, and at least one of those lens elements is driven so as to correct spherical aberration.

For yet another example, according to a method used these days, a collimate lens provided in an optical system is moved so as to change the optical beam incident on an objective lens between incidence from infinity and incidence from non-infinity; in this way, the state of the optical beam incident on the objective lens is changed so as to correct spherical aberration. This method relying on the driving of a collimate lens to correct spherical aberration requires less lens elements than the above-mentioned method employing an expander lens, and is therefore advantageous in miniaturization and cost reduction of optical pickup devices.

Thus, in cases where information is read from or written to a multilayer optical disc by use of an optical pickup device, even when spherical aberration arises and matters, if the optical pickup device is provided with a spherical aberration correction mechanism employing one of the above-mentioned methods, it is possible to correct spherical aberration and thereby prevent degradation in the quality of reading and writing information.

Inconveniently, however, the above-described configuration employing an expander lens or collimate lens and relying on the movement of the lens to correct spherical aberration has the following drawbacks.

In an optical pickup device, the optical beam emitted from a light source is condensed by an objective lens to form a condensed light spot on an optical disc. The size, or the diameter, of this condensed light spot generally depends on the numerical aperture (NA) of the objective lens, the wavelength ($\lambda$) of the light source, and the RIM intensity.

Here, the RIM intensity is an index representing the uniformity of the intensity distribution of the optical beam incident on the objective lens, and is defined as the ratio of the intensity of the part of the optical beam incident at the outermost edge of the objective lens to the intensity of the part of the optical beam incident at the center of the objective lens. That is, the RIM intensity is given by (the intensity of the part of the optical beam incident at the outermost edge of the objective lens)/(the intensity of the part of the optical beam incident at the center of the objective lens).

Of the three factors on which the diameter of the condensed light spot depends, the numerical aperture of the objective lens and the wavelength of the light source are largely determined by standards. Thus, to obtain satisfactory spot quality in the light beam condensed on a recording surface of an optical recording medium, it is important to obtain a satisfactory RIM intensity.

Inconveniently, however, in a configuration where an expander lens is provided, or a collimate lens is driven, to correct spherical aberration, moving the lens to correct spherical aberration causes the RIM intensity to vary, possibly making it impossible to obtain the desired RIM intensity. If the RIM intensity is lower than is desired, the diameter of the condensed light spot on the optical disc is larger than is desired, possibly degrading the quality of, for example, reading information.

On the other hand, in multilayer optical discs such as BDs, the number of layers is not limited to two and is expected to increase to four, six, and so forth. With this increase, the stroke over which the expander lens or collimate lens needs to be moved increases, and this is expected to aggravate the above-mentioned inconvenience of the variation of the RIM intensity.

SUMMARY OF THE INVENTION

In view of the inconveniences mentioned above, it is an object of the present invention to provide an optical pickup device that is ready for a multilayer optical disc but that can nevertheless perform the reading and writing of information to and from any recording layer with stable quality. It is another object of the invention to provide an optical disc apparatus that is provided with such an optical pickup device and that can thus perform recording to and playback from a multilayer optical disc with stable quality.

To achieve the above objects, according to one aspect of the present invention, an optical pickup device is provided with: a light source; an objective lens that condenses an optical beam emitted from the light source on a recording layer of an optical disc; a movable lens that is disposed between the light source and the objective lens and that is movable along the optical axis for correction of spherical aberration; and a RIM intensity adjusting element that is disposed between the light source and the objective lens and that adjusts the RIM intensity by changing the range within which, as the movable lens is moved, the intensity of the optical beam incident on the objective lens can be varied.

With this configuration, even in a case where, to correct spherical aberration, a movable lens is moved and as a result the RIM intensity changes, the RIM intensity adjusting element keeps the RIM intensity at an optimal value. Thus, with an optical pickup device according to the invention, it is possible to correct spherical aberration by driving the lens and simultaneously secure a satisfactory RIM intensity. In this way, it is possible to provide an optical pickup device that can read and write information from and to any recording layer of a multilayer optical disc with stable quality.

According to the invention, in the optical pickup device configured as described above, it is preferable that the RIM intensity adjusting element be a liquid crystal element having a liquid crystal layer laid between two transparent electrodes permitting a voltage to be applied to the liquid crystal layer.

With this configuration, the use of a liquid crystal element as the RIM intensity adjusting element makes it easy to provide an optical pickup device that can read and write information from and to any recording layer of a multilayer optical disc with stable quality.

According to the invention, in the optical pickup device configured as described above, at least one of the two transparent electrode may be formed in a pattern composed of a plurality of split regions so that the transmittance at which the optical beam is transmitted through the plurality of regions can be adjusted independently for each of the regions. In this way, with a simple configuration, it is possible to provide an optical pickup device that can read and write information from and to any recording layer of a multilayer optical disc with stable quality.

According to the invention, in the optical pickup device configured as described above, the pattern composed of the plurality of split regions may be a pattern of concentric circles.

According to the invention, in the optical pickup device configured as described above, at least one of the two transparent electrode may be formed in a pattern composed of a plurality of split regions and in addition the plurality of regions may be each further formed in a pattern producing diffracted light so that the directions in which the optical beam is transmitted through the plurality of regions can be adjusted independently for each of the regions.

According to the invention, in the optical pickup device configured as described above, it is preferable that the movable lens be a collimate lens. This helps reduce the number of lens elements needed to correct spherical aberration, and thus to reduce the overall number of components, contributing to miniaturization and cost reduction of optical pickup devices.

According to another aspect of the invention, an optical disc apparatus is provided with an optical pickup device configured as described above. With this configuration, it is possible to provide an optical disc apparatus that can perform recording to and playback from a multilayer optical disc with stable quality.

DETAILED DESCRIPTION OF PREFERRED EMBODIMENTS

Hereinafter, the details of the invention will be described with reference to the accompanying drawings. It should be understood that the embodiment described below is nothing more than an example and is in no way meant to limit how the invention is implemented.

Figure 1:
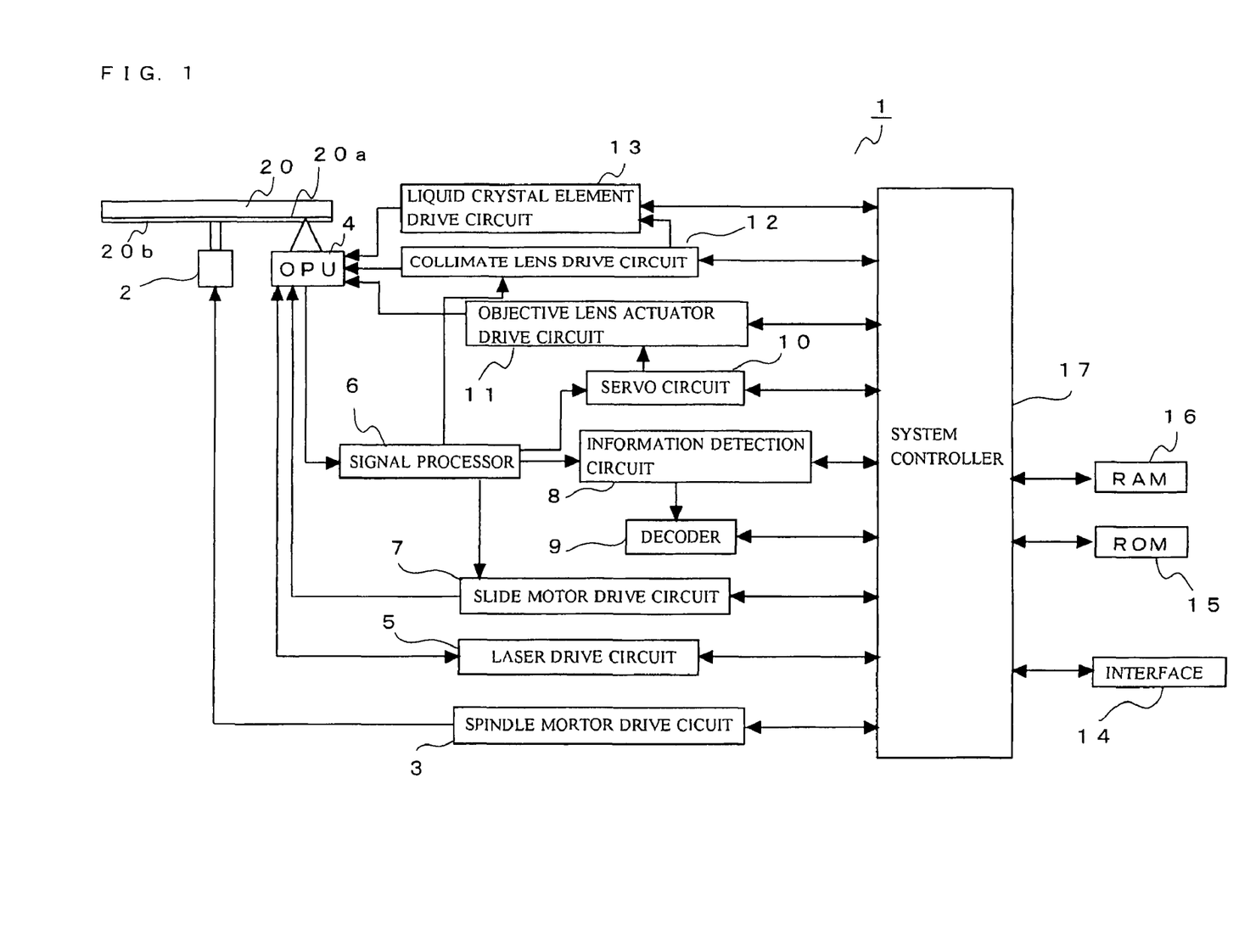
FIG. 1 is a block diagram showing the configuration of an optical disc apparatus embodying the invention.

FIG. 1 is a block diagram showing the configuration of an optical disc apparatus embodying the invention. The optical disc apparatus 1 is provided with an optical pickup device according to the invention. The optical disc apparatus 1 is designed to be capable of performing playback from and recording to a multilayer optical disc 20 having a plurality of recording layers 20a. Here, there is no particular limit on the number of recording layers the multilayer optical disc 20 has. Although the multilayer optical disc 20 is shown as if having only one recording layer in FIG. 1 for the sake of convenience, it should be understood as a multilayer optical disc, and this is true with FIG. 2 as well.

There is no particular limit on the type of the multilayer optical disc 20 (in the following description, also referred to simply as "optical disc"); it may be any of different types of multilayer optical discs such as BDs, DVDs, and CDs. The invention is especially effective with optical pickup devices ready for BDs, for which the correction of spherical aberration is essential.

The reference sign 2 represents a spindle motor, and the optical disc 20 is removably held by a chuck (unillustrated) provided at the top of the spindle motor 2. For the recording or playback of information to or from the optical disc 20, the spindle motor 2 keeps the optical disc 20 rotating. The rotation of the spindle motor 2 is controlled by a spindle motor drive circuit 3.

Figure 2:
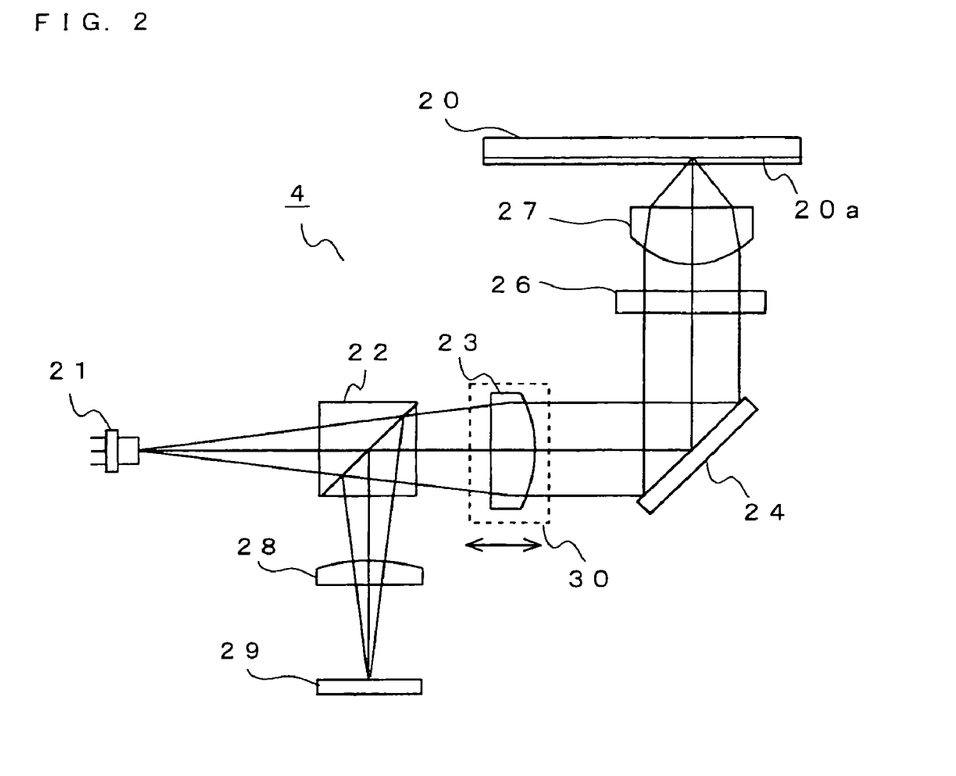
FIG. 2 is a schematic diagram showing the construction of the optical system of the optical pickup device embodying the invention.

The reference sign 4 represents an optical pickup device (OPU), which irradiates the optical disc 20 with laser light emitted from a light source to thereby achieve the writing of information to, and the reading of the information recorded on, the optical disc 20. FIG. 2 is a schematic diagram showing the construction of the optical system of the optical pickup device 4 in this embodiment. As shown in FIG. 2, the optical pickup device 4 is provided with a light source 21, a beam splitter 22, a collimate lens 23, a deflecting mirror 24, a liquid crystal element 26, an objective lens 27, a cylindrical lens 28, and a photodetector 29.

The light source 21 is a semiconductor laser that emits laser light in a 405 nm wavelength band, which is the band corresponding to BDs. To cope with optical discs other than BDs, the wavelength may be changed accordingly. Although this embodiment deals with a configuration that cope only with BDs, the optical pickup device may be so modified as to cope with a plurality of types of optical discs—for example two, namely BDs and DVDs—by use of an increased number of semiconductor lasers, for example.

The beam splitter 22, on one hand, transmits the laser light (polarized light) emitted from the light source 21 to direct it toward the optical disc 20 and, on the other hand, reflects the laser light reflected from the optical disc 20 to direct it toward the photodetector 29.

The collimate lens 23 is so arranged that it can be moved by collimate lens driving means 30; depending on its position, the collimate lens 23 forms the laser light incident thereon into a parallel beam, a divergent beam, or a convergent beam. The purpose of this is to correct spherical aberration by varying the degree of divergence or convergence of the laser light incident on the objective lens 27. That is, arranged as a movable lens, the collimate lens 23 functions as a spherical aberration correction mechanism.

Incidentally, spherical aberration arises because, from one recording layer 20a to another, the thickness of the transparent cover layers 20b protecting them differs. This embodiment deals with a configuration where spherical aberration is corrected by use of a collimate lens 23, for its advantages like reducing the number of lens elements needed. It is possible to adopt instead a configuration where spherical aberration is corrected by use of for example, an expander lens composed of two lens elements of which at least one is movable.

Figure 3:
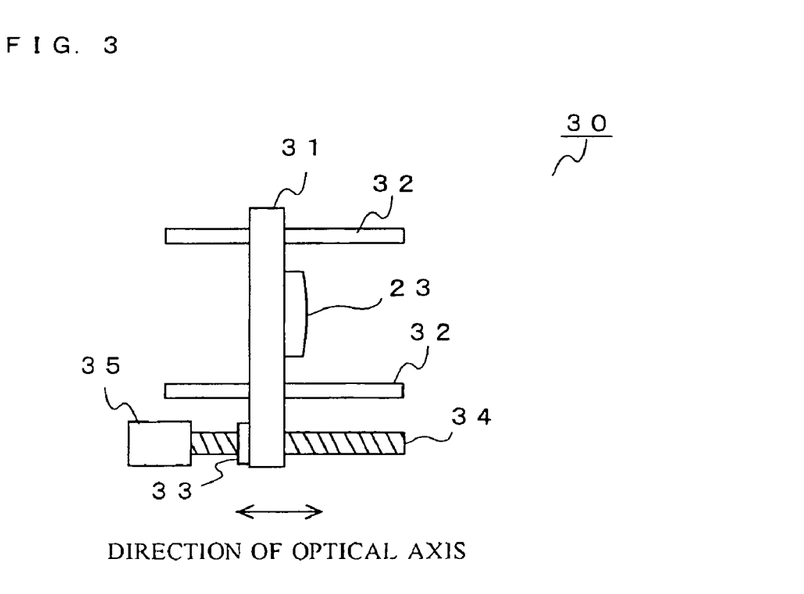
FIG. 3 is a schematic plan view showing the construction of the collimate lens driving means provided in the optical pickup device embodying the invention.

Here, a brief description will be given of the construction of the collimate lens driving means 30 in this embodiment. FIG. 3 is a schematic plan view showing the construction of the collimate lens driving means 30 provided in the optical pickup device 4. The collimate lens driving means 30 is provided with: a movable holder 31 that holds the collimate lens 23 and that is movably arranged; a guide rod 32 that guides the movable holder 31 to move along the optical axis; a lead screw 34 that meshes with a lead nut 33 fitted to the movable holder 31; and a stepping motor 35 that rotates the lead screw 34.

Thus, as the stepping motor 35 rotates the lead screw 34, the collimate lens 23, along with the movable holder 31, moves along the optical axis. For the detection of the reference position of the collimate lens 23, an unillustrated photointerruptor is provided at an appropriate position; moreover, as the motor for rotating the lead screw 34, a stepping motor is used; thus, the position of the collimate lens 23 can be grasped accurately. Needless to say, the collimate lens driving means 30 may be constructed any other way than specifically described here, so long as it can make the collimate lens 23 move along the optical axis.

The deflecting mirror 24 reflects the laser light transmitted through the collimate lens 23 to turn the optical axis of the laser light by 90 degrees, so that the laser light emitted from the light source 21 is eventually directed toward the optical disc 20.

Figure 4A:
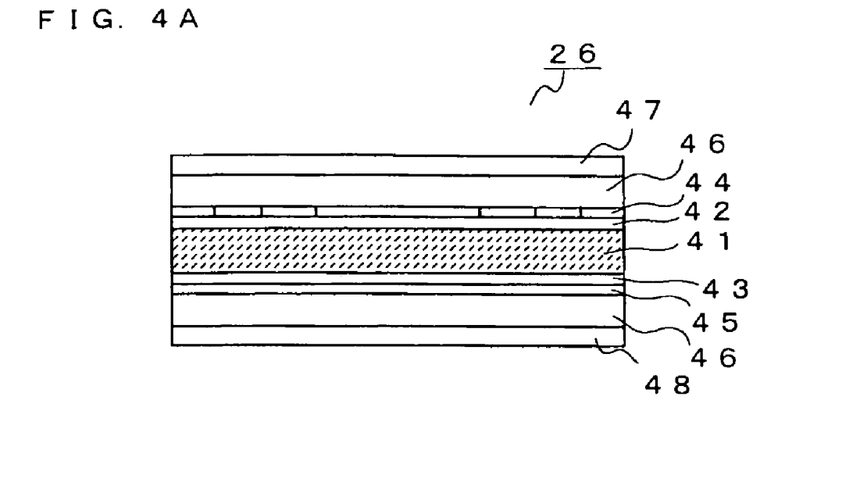
FIG. 4A is a schematic sectional view showing the structure of a liquid crystal element, in illustration of the liquid crystal element provided in the optical pickup device embodying the invention.
Figure 4B:
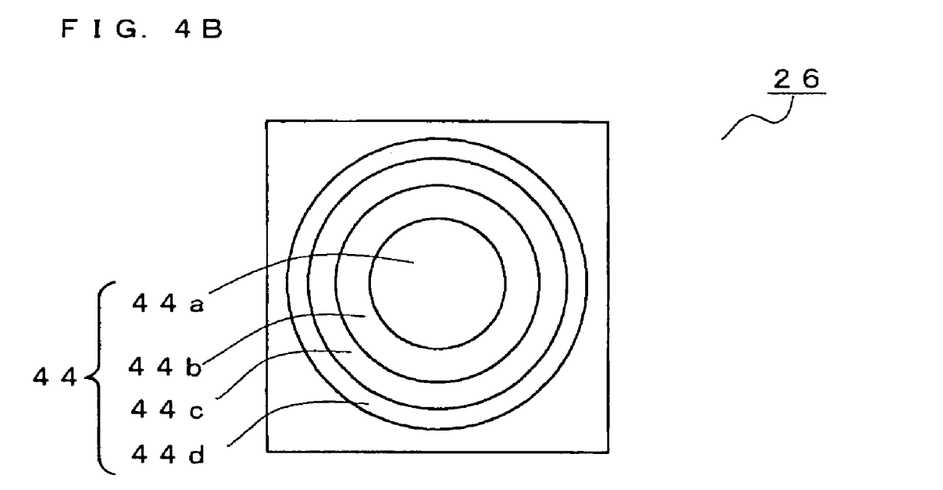
FIG. 4B is a schematic plan view showing the structure of a liquid crystal element, in illustration of the liquid crystal element provided in the optical pickup device embodying the invention.

The liquid crystal element 26 functions as a RIM intensity adjusting element for adjusting the RIM intensity, as will be described later. FIGS. 4A and 4B are diagrams illustrating the structure of the liquid crystal element 26 in this embodiment, FIG. 4A being a schematic sectional view showing the structure of the liquid crystal element 26 and FIG. 4B being a schematic plan view showing the structure of a transparent electrode 44 provided in the liquid crystal element 26.

As shown in FIG. 4A, the liquid crystal element 26 is provided with: a liquid crystal layer 41; alignment films 42 and 43 that determine the direction of alignment of the liquid crystal molecules forming the liquid crystal layer 41; transparent electrodes 44 and 45 that permit a voltage to be applied to the liquid crystal layer 41; a glass substrate 46 that keeps the transparent electrodes 44 and 45 fixed in position; and two polarizer plates 47 and 48 that each transmit light polarized in a particular manner and that are arranged such that the directions of polarization of the light they respectively transmit are mutually perpendicular.

The alignment films 42 and 43 are arranged such that their respective alignment directions are mutually perpendicular, and the liquid crystal element 26 is formed as a liquid crystal element of the so-called TN (twisted nematic) type. Moreover, in this embodiment, the liquid crystal element 26 is so designed that, when a voltage is applied to part of it, the alignment direction of liquid crystal molecules so changes as to lower the transmittance at which the laser light is transmitted through that part. Thus, by adjusting the voltage applied to the liquid crystal element 26, it is possible to adjust its transmittance. Moreover, the polarization direction of the polarizer plate 47, which is provided at the side of the liquid crystal element 26 at which the laser light emitted from the light source 21 is incident on it, is the same as the polarization direction of the laser light emitted from the light source 21 as it has when incident on the liquid crystal element 26 (and this direction is the same as the alignment direction of the alignment film 42).

Moreover, in this embodiment, as shown in FIG. 4B, the transparent electrode 44 is formed in a pattern split into a plurality of regions 44a to 44d of concentric circles. The regions 44a to 44d formed in such a pattern are connected individually to power-supply leads (unillustrated). On the other hand, the transparent electrode 45 is not formed in a pattern but is formed as a single common electrode.

Thus, in the liquid crystal element 26, by giving independent potentials to the regions 44a to 44d of the transparent electrode 44, it is possible to adjust the voltage applied between the transparent electrodes 44 and 45 independently for each of the positions corresponding to the regions 44a to 44d. It is thus possible to adjust the transmittance at which the laser light is transmitted through the liquid crystal element 26 independently for each of the regions 44a to 44d.

Although this embodiment deals with a configuration where the transparent electrode 44 alone is formed in a pattern, this is in no way meant as any limitation; the transparent electrode 45 too may be formed in the same pattern as the transparent electrode 44. Although a liquid crystal element of the TN type is adopted as the structure for a liquid crystal element with adjustable transmittance in this embodiment, this is in no way meant as any limitation; it is possible to adopt instead a liquid crystal element of any other type, for example a liquid crystal element of the so-called STN type.

The objective lens 27 condenses the laser light incident on it on a recording layer 20a of the optical disc 20. The objective lens 27 can be moved by an unillustrated objective lens actuator in two directions, namely in a focusing direction—parallel to the optical axis—and in a tracking direction—parallel to a radius of the optical disc 20. The objective lens actuator so operates as to focus the laser light emitted from the light source 21 on one of the recording layers of the optical disc 20 and make the laser light follow a track formed on the optical disc 20.

The cylindrical lens 28 condenses the laser light reflected from the optical disc 20 on the photodetector 29, while giving the laser light astigmatism. The photodetector 29 receives an optical signal on its unillustrated light-receiving area, and converts it into an electrical signal.

Back in FIG. 1, with respect to the laser light emitted from the light source 21, a laser drive circuit 5 controls the laser power according to the amount of light received by an unillustrated front-monitoring photosensor. During recording, the laser drive circuit 5 also controls the driving of the light source 21 according to a recording signal.

A signal processor 6 receives an electrical signal from the photodetector 29 (see FIG. 2), and processes it to produce an RF signal, a focus error signal (FE signal), a tracking error signal (TE signal), etc.

According to the TE signal produced by the signal processor 6 and to instructions from a system controller 17, a slide motor drive circuit 7 controls the driving of an unillustrated slide motor that is provided to enable the optical pickup device 4 to move radially to the optical disc 20.

An information detection circuit 8 processes, as by equalizing the waveform of, the RF signal fed from the signal processor 6, reads the information recorded on the optical disc 20, and feeds the read information to a decoder 9.

The decoder 9 reproduces data, checks for errors in the data, and, when errors are detected and found correctable, corrects the errors. The data reproduced by the decoder 9 is outputted via an interface 14 to an external apparatus such as a personal computer. The decoder 9 also serves to feed the system controller 17 with an error rate indicating the rate of errors occurring in the reading of data.

Based on the FE signal and the TE signal produced by the signal processor 6, a servo circuit 10 produces a focus drive signal, a tracking drive signal, etc.

According to the focus drive signal, the tracking drive signal, etc. fed from the servo circuit 10, an objective lens actuator drive circuit 11 controls the driving of the objective lens actuator (unillustrated) on which the objective lens 27 is mounted. This enables the objective lens actuator to move the objective lens 27 in the focusing and tracking directions to thereby control focusing and tracking.

According to, for example, the amplitude of the RF signal produced by the signal processor 6, a collimate lens drive circuit 12 controls the driving of the collimate lens driving means 30, which drives the collimate lens 23, such that spherical aberration is corrected properly. Although this embodiment deals with a configuration where spherical aberration is corrected based on the amplitude of the RF signal, it is possible to adopt instead a configuration where spherical aberration is corrected based on, for example, the amplitude of the TE signal, a jitter signal, or the like.

A liquid crystal element drive circuit 13 controls the driving of the liquid crystal element 26. The liquid crystal element drive circuit 13 receives information related to the position of the collimate lens 23 from the collimate lens drive circuit 12 and, based on this information, applies a voltage to the transparent electrodes 44 and 45 of the liquid crystal element 26 such that a proper RIM intensity is obtained. Here, what voltage to apply to the transparent electrodes 44 and 45 in relation to the position of the collimate lens 23 is determined based on experiment data previously acquired. This experiment data is stored in, for example, a ROM 15, which will be described later. The operation of the liquid crystal element 26 functioning as a RIM intensity adjusting element will be described in detail later.

The system controller 17 is provided with a microcomputer, and performs control processing in accordance with the operations the different parts of the optical disc apparatus 1 are expected to execute. The system controller 17 is also provided with a ROM (read-only memory) 15 and a RAM (random-access memory) 16. The ROM 15 stores various parameters and operation programs needed for the system controller 17 to perform various kinds of processing. The RAM 16 is used as a working area by the system controller 17, and also stores various kinds of information whenever necessary.

The optical disc apparatus 1 of the embodiment is configured as described above. Now, the operation of the liquid crystal element 26 functioning as a RIM intensity adjusting element will be described.

Figure 5A:
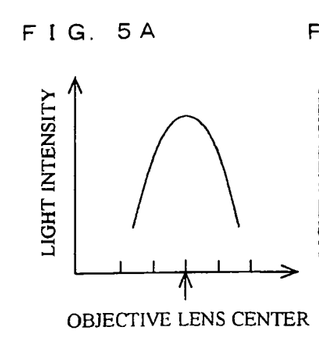
FIG. 5A is a diagram illustrating the reason that the movement of a collimate lens necessitates the adjustment of the RIM intensity.
Figure 5B:
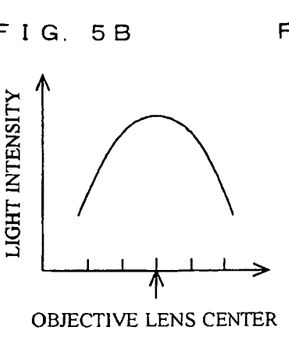
FIG. 5B is a diagram illustrating the reason that the movement of a collimate lens necessitates the adjustment of the RIM intensity.
Figure 5C:
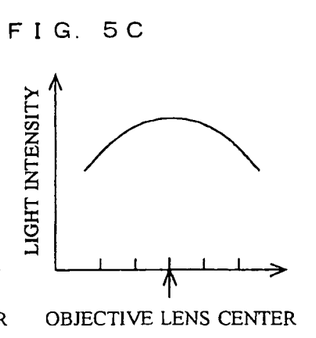
FIG. 5C is a diagram illustrating the reason that the movement of a collimate lens necessitates the adjustment of the RIM intensity.

First, before the description of the operation of the liquid crystal element 26 itself, the reason that the adjustment of the RIM intensity is necessary will be described with reference to FIGS. 5A, 5B, and 5C. FIGS. 5A, 5B, and 5C are diagrams illustrating the reason that the movement of the collimate lens 23 necessitates the adjustment of the RIM intensity; these are graphs schematically showing how the light intensity distribution of the laser light incident on the objective lens 27 varies with the position of the collimate lens 23. FIGS. 5A, 5B, and 5C in this order show the results with the collimate lens 23 located increasingly far from the light source 21.

As shown in FIGS. 5A, 5B, and 5C, the closer the collimate lens 23 is to the light source 21, the lower the RIM intensity, which is given by (the intensity of the part of the optical beam incident at the outermost edge of the objective lens)/(the intensity of the part of the optical beam incident at the center of the objective lens). On the other hand, to permit the spot diameter of the laser light condensed by the objective lens 27 to be made as small as desired, the RIM intensity needs to be controlled not to be lower than a certain level.

Accordingly, it is undesirable that, as the collimate lens 23 moves, the RIM intensity varies below the certain level. Thus, the RIM intensity needs to be adjusted to remain equal to or higher than the certain level (preferably constant at an optimal level). For this purpose, in this embodiment, the liquid crystal element 26 is arranged in the optical system.

Figure 6A:
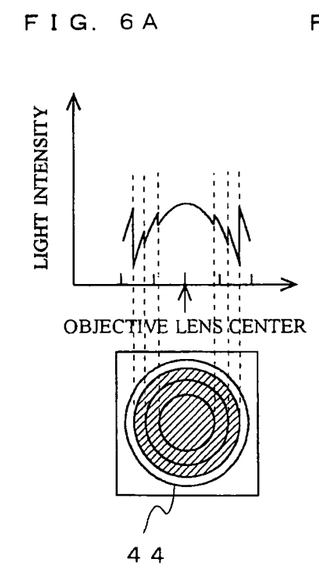
FIG. 6A is a diagram illustrating the operation for the adjustment of the RIM intensity achieved by the liquid crystal element provided in the optical pickup device embodying the invention.
Figure 6B:
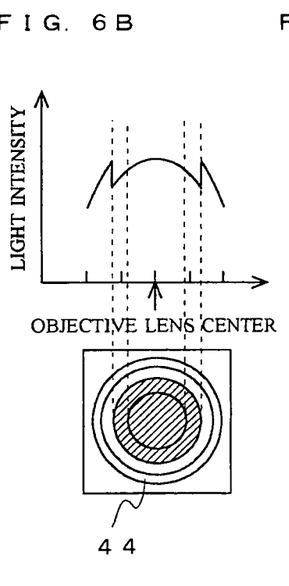
FIG. 6B is a diagram illustrating the operation for the adjustment of the RIM intensity achieved by the liquid crystal element provided in the optical pickup device embodying the invention.
Figure 6C:
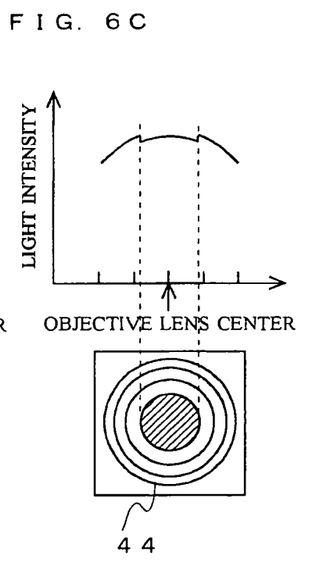
FIG. 6C is a diagram illustrating the operation for the adjustment of the RIM intensity achieved by the liquid crystal element provided in the optical pickup device embodying the invention.

FIGS. 6A, 6B, and 6C are diagrams illustrating the operation for the adjustment of the RIM intensity achieved by the liquid crystal element 26. FIGS. 6A, 6B, and 6C schematically show how the RIM intensity is adjusted by the liquid crystal element 26 when the light intensity distribution of the laser light incident on the objective lens 27 is as shown in FIGS. 5A, 5B, and 5C, respectively.

The RIM intensity is adjusted in the following manner. In a case where, without adjustment, the RIM intensity is high enough (as shown in FIG. 5C), it is possible to obtain the desired RIM intensity simply by lowering the light intensity only in an area close around the center of the objective lens 27. By contrast, in a case where, without adjustment, the RIM intensity is too low (as shown in FIG. 5A), it is possible to obtain the desired RIM intensity only by lowering the light intensity in an area spread farther toward the edge of the objective lens 27. Thus, in the adjustment of the RIM intensity, the closer the collimate lens 23 is to the light source 21 (as one goes from FIG. 6C to FIG. 6A), the larger the area needs to be made in which the intensity of the laser light is varied (in this embodiment, lowered).

To achieves this, in the liquid crystal element 26 of this embodiment, as described previously, the transparent electrode 44 is formed in a pattern split into a plurality of regions of concentric circles, and the plurality of regions are given independent potentials. When, as shown in FIG. 6C, it is inferred, from the position of the collimate lens 23, that, without adjustment, the RIM intensity is high enough, a voltage is applied only in a small area of the transparent electrode 44 (of all the regions of the transparent electrode 44, the central one) to lower the light intensity there. In FIGS. 6A, 6B, and 6C, of all the regions of the transparent electrode 44, those to which a voltage is being applied for the adjustment of the RIM intensity are indicated by hatching.

By contrast, when it is inferred, from the position of the collimate lens 23, that, without adjustment, the RIM intensity is too low, then, as shown in FIGS. 6B and 6A, it is necessary to apply a voltage in an increasingly large area of the transparent electrode 44 (of all the regions of the transparent electrode 44, those used spread from center to edge) to lower the light intensity there. By controlling the operation of the liquid crystal element 26 in this way, it is possible to constantly keep an optimal RIM intensity irrespective of the position of the collimate lens 23.

In the example above, in the case shown in FIG. 6A, of all the regions of the transparent electrode 44, those to which a voltage is applied each receive a different voltage; by contrast, in the case shown in FIG. 6B, of all the regions of the transparent electrode 44, those to which a voltage is applied all receive an identical voltage.

Which of the regions of the transparent electrode 44 to apply a voltage to and what voltage to apply to each of them are previously found through experiments conducted such that an optimal RIM intensity is obtained with the collimate lens 23 at different positions. Based on the data thus obtained, the liquid crystal element 26 is operated. Thus, the operation of the liquid crystal element 26 specifically described above should be understood to be merely an example. Although this embodiment deals with a configuration where the transparent electrode 44 of the liquid crystal element 26 is split into four regions, this is in no way meant as any limitation; it may be split into any other number of regions.

In the example described above, in all of the different cases, the liquid crystal element 26 is driven in some way or other (a voltage is applied between the transparent electrodes 44 and 45) to adjust the RIM intensity. Needless to say, in a case where the position of the collimate lens 23 is such that, without adjustment, the RIM intensity is optimal, the liquid crystal element 26 does not need to be driven.

Figure 7:
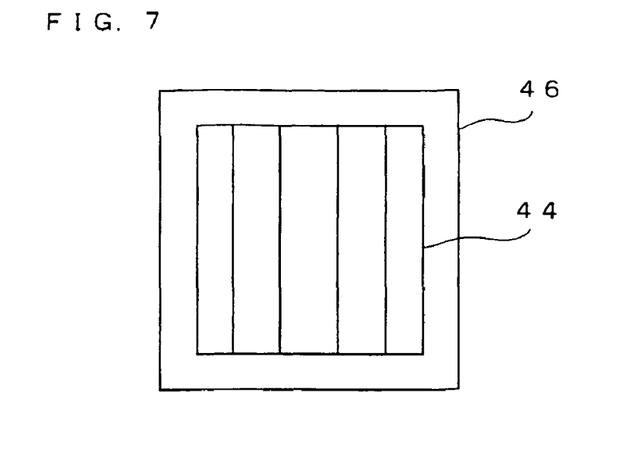
FIG. 7 is a diagram showing a modified example of the liquid crystal element provided in the optical pickup device embodying the invention.

In the embodiment described above, the transparent electrode 44 of the liquid crystal element 26 is formed in a pattern split into a plurality of regions of concentric circles. This, however, is not meant to limit the splitting pattern of the transparent electrode 44 to that specifically described as adopted in the embodiment. The laser light emitted from the semiconductor laser used as the light source 21 has an elliptic light intensity distribution. Accordingly, in a case where the laser light incident on the liquid crystal element 26 has an elliptic light intensity distribution, the transparent electrode 44 may be given, instead of a pattern split into concentric circles, a pattern split into stripes as shown in FIG. 7.

The optical pickup device 4 typically incorporates, arranged in its optical system, a beam shaping element (for example, a prism) for making the beam shape of the laser light emitted from the light source 21 circular. This is the reason that this embodiment adopts, as a configuration preferable in a case where the laser light incident on the liquid crystal element 26 has a circular light intensity distribution, one in which a liquid crystal element 26 having a transparent electrode 44 formed into a pattern of concentric circles is arranged in the optical system.

Moreover, in the embodiment described above, the liquid crystal element 26 functioning as a RIM intensity adjusting element is so structured as to adjust the RIM intensity by permitting the transmittance at which the laser light is transmitted through a plurality of regions of the liquid crystal element 26 to be adjusted independently for each of those regions. This, however, is in no way meant as any limitation. Instead, for example, a liquid crystal element may be used that adjusts the RIM intensity by permitting the direction in which the laser light is transmitted through a plurality of regions of the liquid crystal element to be adjusted independently for each of those regions. Now, this will be described with reference to FIGS. 8A and 8B.

Figure 8A:
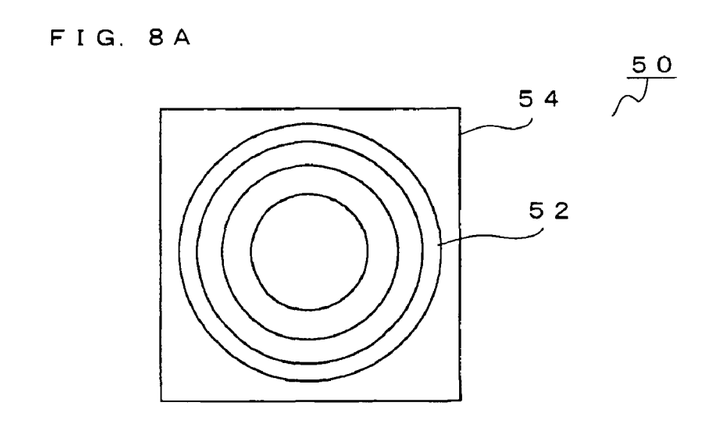
FIG. 8A is a schematic plan view showing the structure of a differently structured liquid crystal element, in illustration of the structure of a liquid crystal element structured differently from the liquid crystal element provided in the optical pickup device embodying the invention.
Figure 8B:
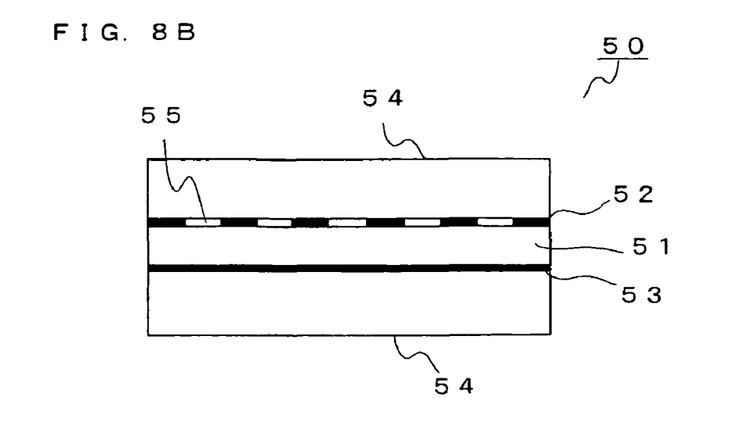
FIG. 8B is a schematic sectional view showing part of the structure of a differently structured liquid crystal element, in illustration of the structure of a liquid crystal element structured differently from the liquid crystal element provided in the optical pickup device embodying the invention.

FIGS. 8A and 8B are diagrams illustrating the structure of a liquid crystal element 50 structured differently from the liquid crystal element 26 used in the embodiment, FIG. 8A being a schematic plan view of the liquid crystal element 50 and FIG. 8B being a sectional view of part of the liquid crystal element 50. As shown in FIGS. 8A and 8B, the liquid crystal element 50 is provided with a liquid crystal layer 51, two transparent electrodes 52 and 53 between which the liquid crystal layer 51 is held, and a glass substrate 54 that holds the transparent electrodes 52 and 53.

As shown in FIG. 8A, the transparent electrode 52 of the liquid crystal element is formed in a pattern split into a plurality of regions of concentric circles. These regions are each further formed into a pattern that produces diffracted light. In FIG. 8B is shown a section of part of one of the plurality of regions. The transparent electrode 53 is not split, but is formed as a common electrode.

As shown in FIG. 8B, each of the plurality of regions is formed into a pattern composed of, arranged alternately and at predetermined intervals, regions where the transparent electrode 52 is formed and regions 55 where the transparent electrode 52 is not formed. In the pattern thus formed, whereas the index of refraction of the parts sandwiched between the transparent electrodes 52 and 53 changes when a voltage is applied, that of the parts sandwiched between the regions 55, where the transparent electrode 52 is not formed, and the transparent electrode 53 remains constant. Thus, applying a voltage between the transparent electrodes 52 and 53 enables the pattern to function as a diffractive pattern. This makes it possible to adjust the RIM intensity by permitting the direction in which the laser light is transmitted through the plurality of regions to be adjusted independently for each of these regions.

Although the embodiment described above adopts a configuration where the liquid crystal element 26 is arranged between the collimate lens 23 and the objective lens 27, the liquid crystal element 26 may instead be arranged between the light source 21 and the collimate lens 23 as the case may be.

According to the invention, in an optical pickup device ready for a multilayer optical disc, spherical aberration can be properly corrected, and the RIM intensity can be properly adjusted. Thus, it is possible to provide an optical pickup device that can perform the reading and writing of information to and from any recording layer with stable quality. Moreover, according to the invention, by use of such an optical pickup device, it is possible to provide an optical disc apparatus that can perform recording to and playback from a multilayer optical disc with stable quality. The invention is thus useful in the fields of optical pickup devices and optical disc apparatuses.

What is claimed is:

1. An optical pickup device comprising:
   a light source;
   an objective lens condensing an optical beam emitted from the light source on a recording layer of an optical disc;
   a movable lens disposed between the light source and the objective lens, the movable lens being movable along an optical axis for correction of spherical aberration; and
   a RIM intensity adjusting element disposed between the light source and the objective lens, the RIM intensity adjusting element adjusting RIM intensity by changing a range within which, as the movable lens is moved, intensity of the optical beam incident on the objective lens can be varied.

2. The optical pickup device according to claim 1, wherein the RIM intensity adjusting element is a liquid crystal element having a liquid crystal layer laid between two transparent electrodes permitting a voltage to be applied to the liquid crystal layer.

3. The optical pickup device according to claim 1, wherein the movable lens is a collimate lens.

4. The optical pickup device according to claim 2,
   wherein at least one of the two transparent electrodes is formed in a pattern composed of a plurality of split regions, and
   wherein transmittance at which the optical beam is transmitted through the plurality of regions can be adjusted independently for each of the regions.

5. The optical pickup device according to claim 2,
   wherein at least one of the two transparent electrodes is formed in a pattern composed of a plurality of split regions,
   wherein the plurality of regions are each further formed in a pattern producing diffracted light, and
   wherein directions in which the optical beam is transmitted through the plurality of regions can be adjusted independently for each of the regions.

6. The optical pickup device according to claim 2, wherein the movable lens is a collimate lens.

7. The optical pickup device according to claim 4, wherein the pattern composed of the plurality of split regions is a pattern of concentric circles.

8. The optical pickup device according to claim 4, wherein the movable lens is a collimate lens.

9. The optical pickup device according to claim 5, wherein the movable lens is a collimate lens.

10. The optical pickup device according to claim 7, wherein the movable lens is a collimate lens.

11. An optical disc apparatus comprising the optical pickup device according to claim 1.

* * * * *